United States Patent [19]
Konen et al.

[11] 3,728,746
[45] Apr. 24, 1973

[54] PLUMBING MANIFOLD

[75] Inventors: Thomas P. Konen, Somerville; Robert W. Smith, Flanders, both of N.J.

[73] Assignee: American Standard Inc., New York, N.Y.

[22] Filed: July 7, 1970

[21] Appl. No.: 52,872

[52] U.S. Cl. ..................................................4/192
[51] Int. Cl. ................................................E03c 1/04
[58] Field of Search.........................4/6, 7, 145, 191, 4/192

[56] References Cited

UNITED STATES PATENTS

| | | | |
|---|---|---|---|
| 2,997,722 | 8/1961 | Pearson | 4/191 |
| 1,752,782 | 4/1930 | Burton | 4/7 |

FOREIGN PATENTS OR APPLICATIONS

| | | | |
|---|---|---|---|
| 636,992 | 12/1963 | Belgium | 4/191 |
| 62,525 | 7/1944 | Denmark | 4/191 |
| 228,385 | 3/1960 | Australia | 4/145 |

*Primary Examiner*—Houston S. Bell, Jr.
*Assistant Examiner*—Donald B. Massenberg
*Attorney*—Jefferson Ehrlich, Tennes I. Erstad and Robert G. Crooks

[57] ABSTRACT

This invention covers a manifold for a plumbing fitting or fixture which may include a valve mechanism, such as a single lever faucet, and a spout. The manifold structure includes a plurality of conduits which are formed internally of the structure for interconnecting pipes transmitting hot and cold water with the valve mechanism and in turn with the spout. The manifold is made essentially of two metallic or plastic substantially parallel plates which may be relatively thin. One of the two plates will be bulged wherever conduits are to be provided. The second plate of the manifold need not have any bulges for completing the conduits. The two plates are joined together permanently so that the manifold may be connected as a unit to the valve mechanism and the spout, either at the factory or at the place where the combination is to be installed.

13 Claims, 12 Drawing Figures

Patented April 24, 1973

INVENTORS:
T. P. KONEN
R. W. SMITH
BY
Jefferson Ehrlich
ATTORNEY

Patented April 24, 1973 3,728,746

INVENTORS:
T. P. KONEN
R. W. SMITH
BY
ATTORNEY

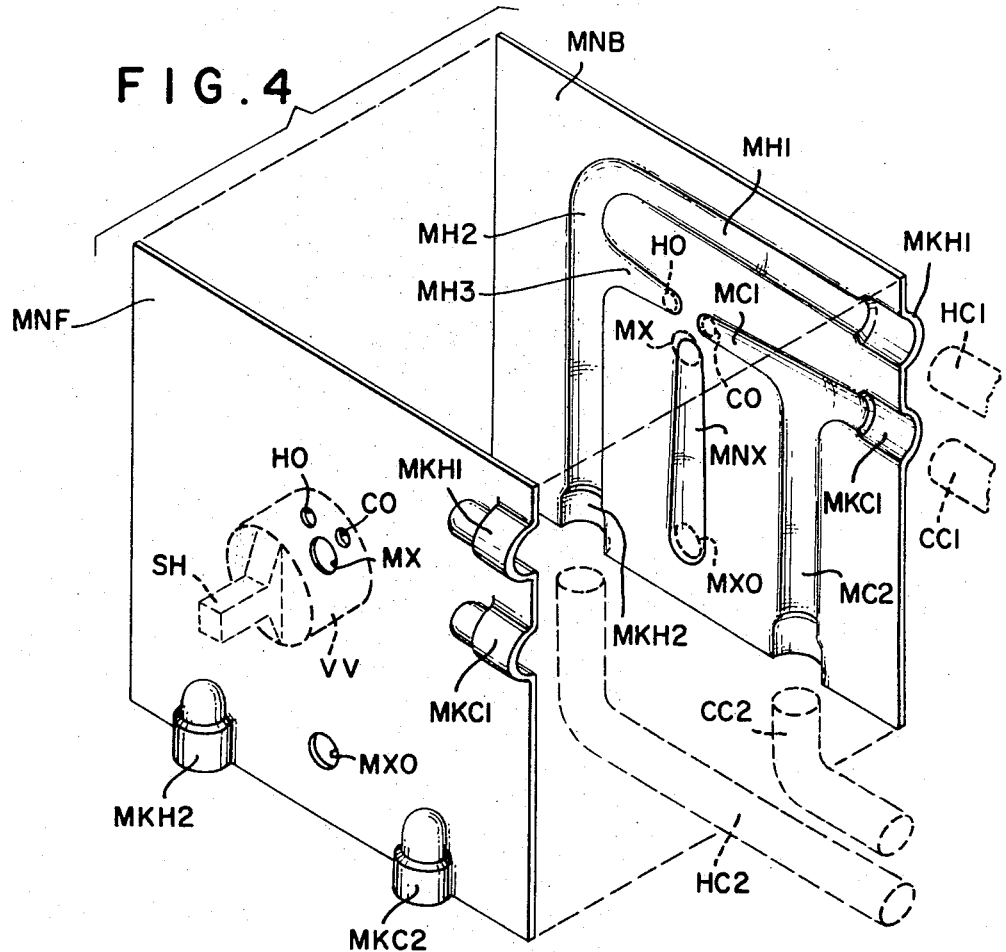
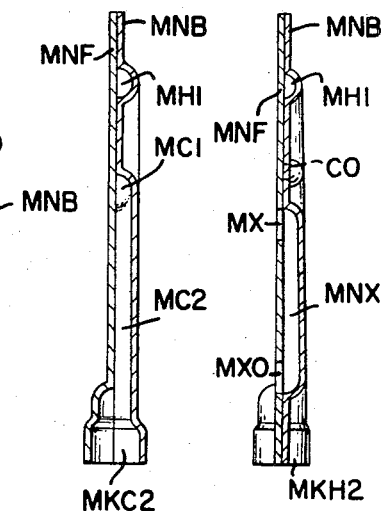
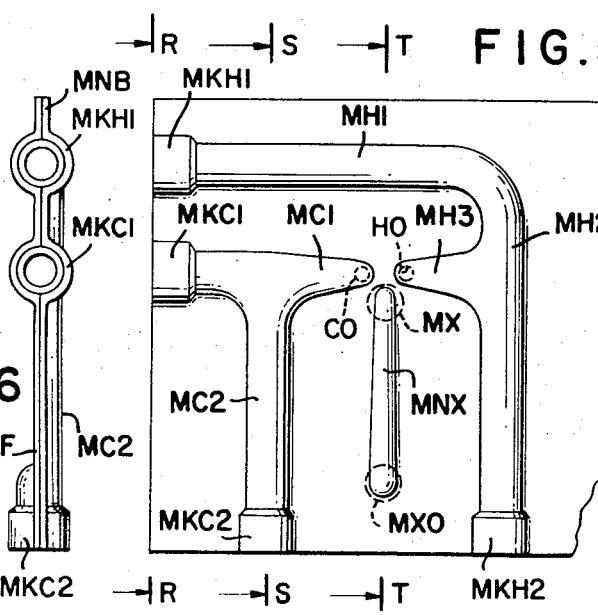
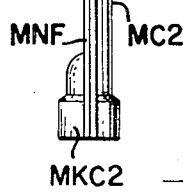
INVENTORS:
T. P. KONEN
R. W. SMITH
BY Jefferson Ehrlich
ATTORNEY

INVENTORS:
T. P. KONEN
R. W. SMITH
BY
ATTORNEY

PLUMBING MANIFOLD

This invention relates generally to improved plumbing fixtures and to improved plumbing fittings and to improved piping and conduits for such fixtures and fittings. More particularly, this invention relates to improved and simplified plumbing fixtures and fittings and conduits which are suitable for easy manufacture at low cost and substantially free of defects and, at the same time, are easily installable as parts of kitchens, bathrooms, etc. in new or modernized buildings.

As is well known, there has been a severe housing shortage in recent years due, not only to the substantial growth in the population, but also, in some important part at least, to the escalating costs of plumbing equipment, and in the costs of installation of such equipment, and, equally importantly, to the shortage of available manpower, especially skilled people, such as plumbers, for installation, testing and repair of such equipment. Materials such as brass, copper, steel and other materials, which are frequently used in the plumbing industry for the manufacture of plumbing equipment, have risen somewhat sharply in price, and, consequently, the cost of manufacture has likewise increased. When the plumbing items are available for purchase and installation, plumbers and their helpers and other construction workers who are required to install such items, because of their complexity, are in short supply and, even when such people are available, the labor and service charges have risen to a high level. The costs of hiring such people even for short intervals are almost prohibitively high for the average building owner or operator. Due the unusual conditions prevailing in the building and construction industries over several years, it has become a virtual necessity to find new and improved materials and new and improved products and arrangements and methods of manufacture and new and improved methods of installation and other practical solutions to meet this growing distressing and disturbing problem affecting the entire nation, at all levels of construction.

One of the principal objects of the present invention is to provide simple and improved plumbing fittings and fixtures and the related piping and conduits and other appurtenances, so that the necessary plumbing fittings and fixtures may be manufactured in volume at low cost, of good quality, free of defects, and requiring little or no servicing.

Another of the principal objectives of the present invention is to provide simple and inexpensive plumbing fixtures and fittings which are easily and quickly installed, either in a new building or in a building requiring modernization, the installation to be performed by a minimum of personnel, and especially by a minimum of skilled or scarce personnel such as plumbers.

Another of the objectives of this invention is to provide what may be called, and will hereafter be called, a manifold in the form of two substantially flat parallel plates so shaped and contoured that, when the two plates are permanently joined together, they will contain bulges to provide openings or conduits of sufficient size for the flow of fluid, such as water, to be used whenever and wherever desired in almost any volume and at almost any appropriate temperatures.

One of the key or elemental equipments of this invention consists of a fabricated or prefabricated structure produced, for example, at the factory from two plates or stampings which are to be arranged to be substantially parallel to each other but nevertheless have appropriate contours therein so that, when the two plates are joined together by adhesive or other suitable materials or by brazing, the contours of the two plates will provide one or more ducts or conduits through which may flow fluids, such as water, at the usual ranges of temperature, the flow paths leading to plumbing fittings, such as a faucet, through which the fluid may be discharged. The two plates may be made of metal, such as stainless steel, or of plastic materials, and, when joined to each other by suitable adhesive materials or by brazing, the plates will be permanently united and inseparable under a wide range of operating conditions. When so produced, the manifold will be capable of transmitting fluids efficiently to the plumbing fittings through the ducts or conduits of the manifold to the appropriate conduits of the plumbing fittings.

The manifold of this invention is to provide, in addition to the conduits which are built into the walls of the manifold, openings or apertures in the walls of the manifold so that connections to plumbing fittings may be easily and conveniently established. Thus, if a faucet is to be coupled to the manifold, one opening in the wall of the manifold may be provided to allow water to enter the fitting from a conduit of the manifold, while another opening in the wall of the manifold may allow water to be returned to another conduit of the manifold and then returned to the faucet to be discharged through the faucet.

For example, if a fitting, such as a single lever faucet, is to be coupled to the manifold, two openings in the wall of the manifold may be provided to allow hot and cold water to flow from respective pre-assigned conduits of the manifold to the fitting where the hot and cold water will be mixed and then returned to another conduit of the manifold through another opening in the wall of the manifold, so that the mixed water at an intermediate temperature may then be transmitted through another opening in the wall of the manifold to the faucet by which the mixed water will be discharged. Moreover, the internal structure of the manifold may also embody additional conduits which may extend to other manifolds or to other fittings or to other pipes or conduits, so that the hot and cold water received by the manifold will be relayed to other parts of the building. Thus, the manifold may serve as a repeater or a repeater point. The repeater may be connected or coupled to like repeaters in the same room or in the same apartment or in different apartments of the same building, etc.

The manifold of this invention, including its internal conduits and its openings, is readily mass produced, whether the manifold is made of metallic or plastic materials. Moreover, such manifolds may be constructed as prefabricated items, so that they may be easily and quickly installed, individually or in groups, in a building such as a home. The installation may be accomplished, if desired, without the aid or guidance of a plumber. The installation will be permanent and the manifold will be long lasting and substantially free of leakage and maintenance problems.

This invention, together with its objects and features, will be better and more clearly understood from the following more detailed description and explanation hereinafter following when read in connection with the accompanying drawing in which:

FIG. 4 illustrates another exploded perspective view of the manifold of this invention;

FIG. 5 illustrates a rear view of the manifold shown, for example, in FIG. 4;

FIG. 6 illustrates a side elevational view when seen along the lines R—R of FIG. 5;

FIG. 7 illustrates another cross-sectional view taken along the lines S—S of FIG. 5;

FIG. 8 illustrates another cross-sectional view taken along the lines T—T of FIG. 5;

Figure 9:
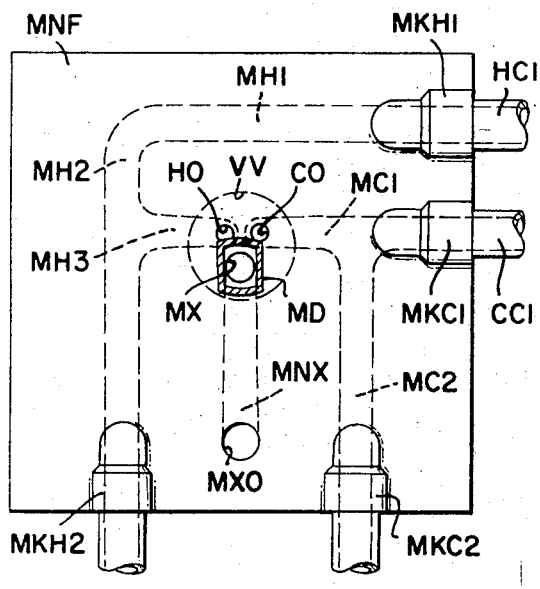
Figure 10:
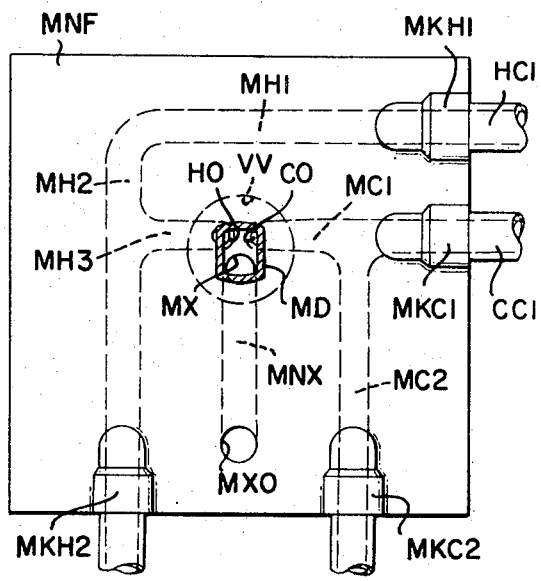
Figure 11:
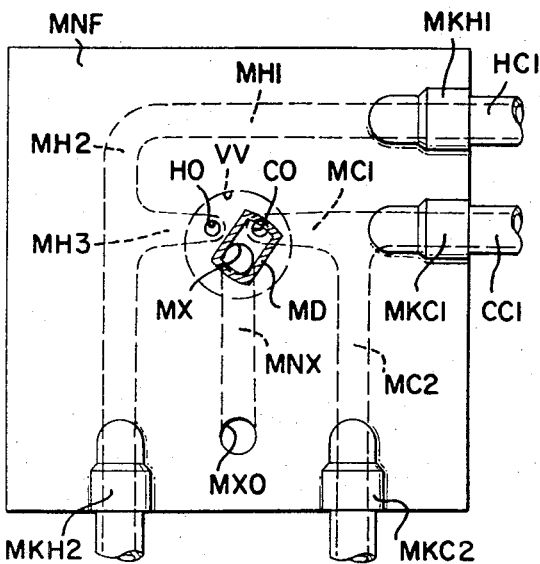
Figure 12:
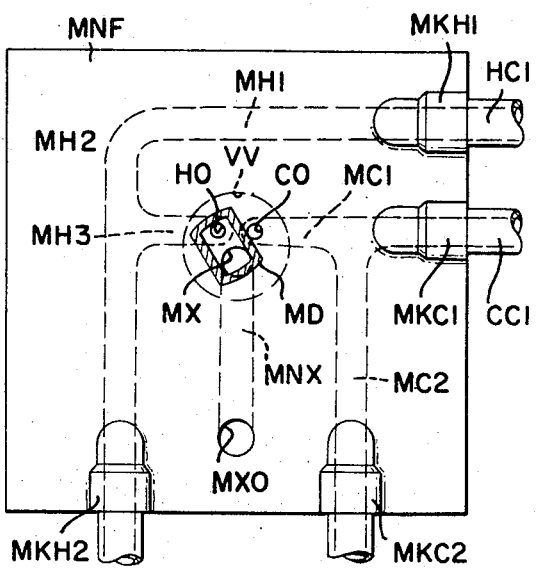

FIG. 9 displays a schematic of the manifold along with an associated movable disc mechanism which may control a single lever faucet;

FIGS. 10, 11 and 12 illustrate other schematic representations, similar to that of FIG. 9, depicting the movable disc mechanism of a single lever faucet in still other positions for different mixtures of incoming fluids.

The same or similar reference characters will be employed throughout the various figures of the drawing to designate or refer to the same or similar parts wherever they may occur throughout the drawing.

Figure 1:
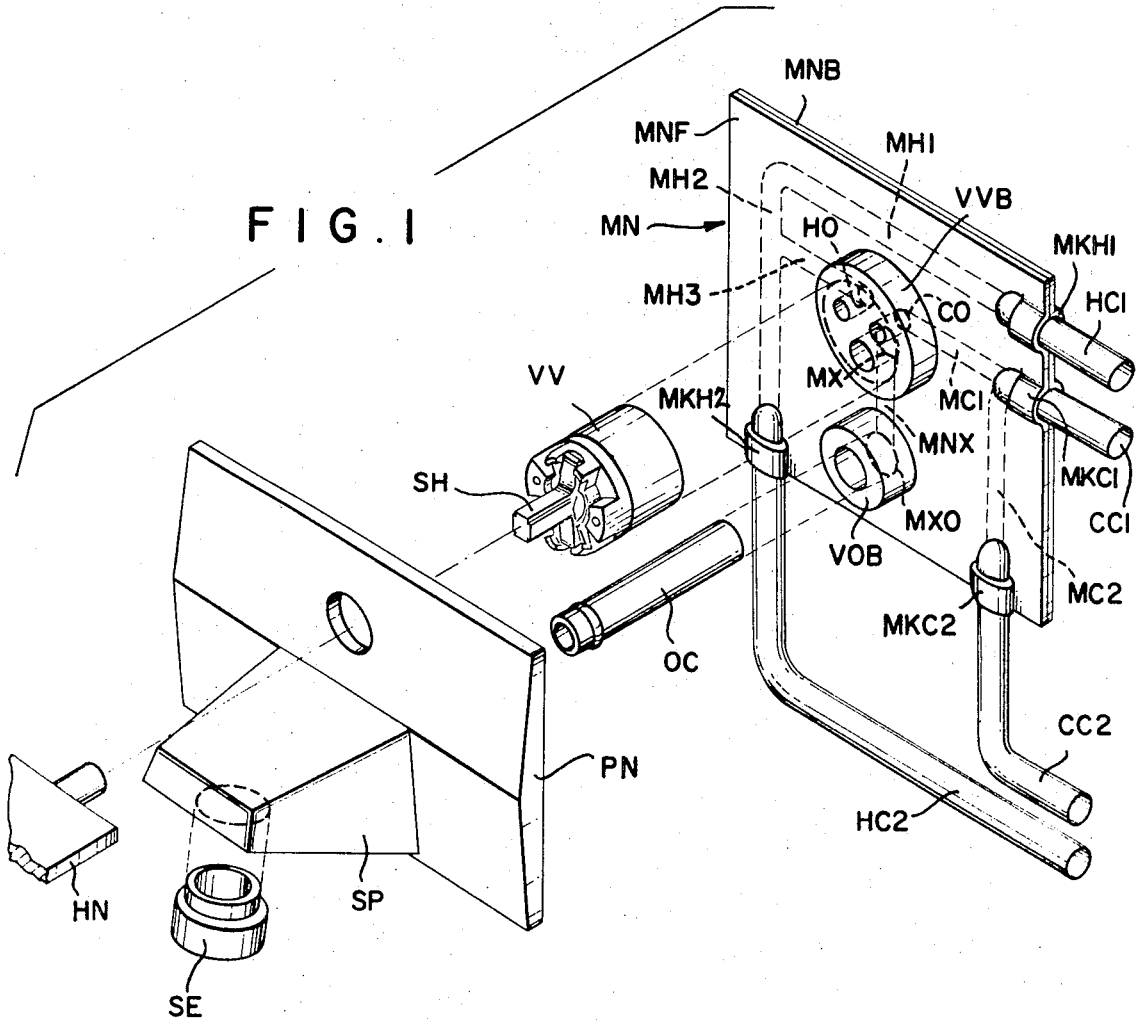
FIG. 1 illustrates an exploded view of one form of equipment, presented in perspective, illustrating one form of manifold and accompanying equipment and its structural features.
Figure 2:
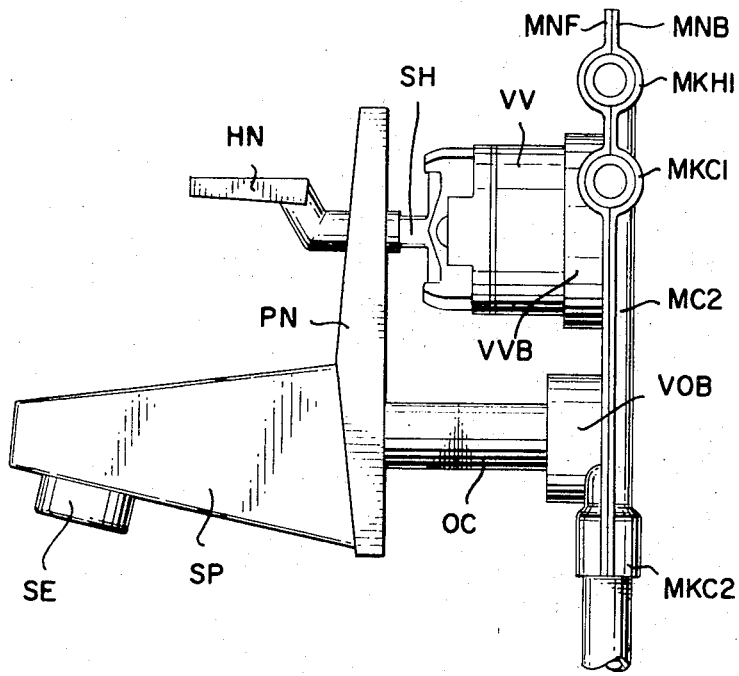
FIG. 2 illustrates a side elevation of the assembled equipment of FIG. 1.
Figure 3:
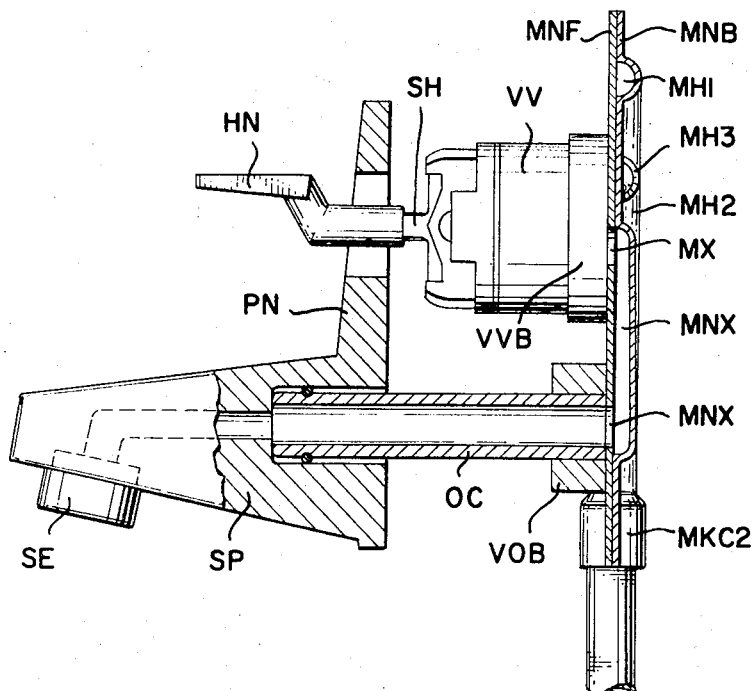
FIG. 3 shows another side elevation, similar to that of FIG. 2, in which the manifold is shown partially in cross-section.

Referring to the drawing, and especially to FIG. 1 of the drawing, there is shown a manifold MN, a valve mechanism VV, which may be, and is, part of a single lever faucet of any well known type as, for example, the type which is shown and described in an application of R.G. Parkison, Ser. No. 796,139, filed Feb. 3, 1969, now U.S. Pat. No. 3,533,436, issued Oct. 13, 1970, a panel PN having an integral spout SP, a spout end SE, a handle HN which may be manipulated to control the valve mechanism VV, and an outlet pipe or conduit OC for interconnecting the manifold MN to the spout SP. The manifold MN may have two basal projections VVB and VOB for supporting or holding the valve mechanism VV and the outlet pipe OC, respectively. The manifold MN may be connected to two conduits HCl and CCl which may be employed to feed hot and cold water, respectively, to the manifold MN. The valve mechanism VV may be employed to mix the hot water and the cold water supplied through conduits HCl and CCl to the manifold MN, the degree of mixture and the volume of water to be controlled by the movement of the handle HN, and the mixed water in whatever volume may be returned to the manifold and then fed to the outlet pipe OC. The outlet pipe OC may feed the mixed water through the spout SP and through the spout end SE. As will be described, the manifold MN may include a number of internal conduits through which the fluids are transmitted to the valve mechanism VV and for re-transmitting the fluids mixed by the valve mechanism VV, after the mixture is completed, to one or more other conduits of the manifold MN for feeding the mixed fluid to the outlet conduit OC and then to the spout SP to be discharged by the spout end SE.

As can be seen more clearly from FIGS. 1 and 4, the manifold MN consists of two plates which may be equal in size and are substantially parallel to each other. The two plates are designated MNF and MNB, the plate MNF to be called the front plate, and the plate MNB to be called the back or rear plate. The manifold MN includes two input collars or receptors MKH1 and MKC1 which are sufficiently large so as to receive the respective conduits HCl and CCl which may respectively supply, for example, hot water and cold water. The conduits HCl and CCl may be joined to the collars MKH1 and MKC1 respectively, either by brazing the two together, or by appropriate threading, or by suitable adhesives, or by other means, so that they mesh with, and are bound to, each other and are sealed with each other by any appropriate glue or other binder. Hot water entering from the conduit HCl will be transmitted through the collar MKH1 then through a conduit MH1 and a connecting conduit MH2 which may lead to another conduit MH3 so that the fluid may traverse an opening or aperture HO in the front plate MNF which leads into a channel of the valve mechanism VV. Likewise, the conduit CCl will supply cold water through the collar MKC1, then through the conduit MC1 and through another adjacent opening or aperture CO which is also formed in the front plate MNF of the manifold MN, so that the cold water may also enter a channel of the valve mechanism VV. The valve mechanism VV has a movable shank or lever SH upon which is mounted the handle HN for controlling and adjusting the mixture of hot and cold water received by the valve mechanism VV. The shank SH may be moved, as is well known and as is shown and described by the above-noted patent of R.G. Parkison, either to adjust the valve mechanism VV to increase the total quantity of water supplied by the hot and cold water conduits, or to change or adjust the ratio of the incoming hot water to the incoming cold water, or both, as may be desired. As the two fluids, i.e., the hot water and the cold water, are mixed by and within the valve mechanism VV under control of the handle HN, the mixed water will travel through the opening or aperture MX in the front plate MNF of the manifold MN, then through the conduit MNX within the manifold MN, then out through the opening or aperture MXO in the front plate MNF and then through the outward conduit OC to the spout SP to be discharged by the spout end SE. Thus, the hot and cold water will be supplied to the manifold MN through substantially similar paths or conduits and then supplied to the valve mechanism VV to be mixed, and then returned to another conduit of manifold MN to be discharged through the outlet pipe OC which leads to the spout SP and the spout end SE.

It will be observed from FIGS. 1 and 4, for example, that the MH1 MH1 and MH2 of the manifold MN are serially connected, or are parts of the same conduit, between the collars MKH1 and MKH2 of the manifold MN. Similarly, conduits MC1 and MC2 of manifold MN are connected in series with each other, or are parts of a single conduit, between collars MKC1 and MKC2. The collars MKH2 and MKC2 may be connected by conduits HC2 and CC2, respectively, to other similar manifolds (not shown) or to other plumbing fixtures. Thus, the manifold MN constitutes a module or repeater for transferring hot or cold water, or a mixture of the two, to similar or other modules or repeaters which are not shown.

The front plate MNF of the manifold MN is shown to have two optional bases or platforms VVB and VOB which are protrusions provided to support the valve mechanisms VV and the outlet pipe or conduit OC, respectively. Such bases or platforms are not required and may, if desired, be completely omitted. If omitted, the valve mechanism VV and the outlet pipe OC should include appropriate means for connection to the front plate MNF to establish paths to the apertures in the front plate MNF, as shown and described.

The front plate MNF of the manifold MN May be in the form of a thin plate of metal or of plastic material having a number of holes or apertures, for example, three, for the above-noted connections to the valve mechanism VV and a fourth hole or aperture for connection, for example, to the outlet pipe OC. In addition to these openings or apertures, the front plate MNF may also include portions of the collars, such as MKH1 and MKC1 to which the respective hot and cold water incoming supplies may be connected, as already explained. It will be observed that the two collars MKH1 and MKC1 are tapered down to smoothly meet the adjacent conduits MH1 and MC1, respectively, the latter conduits being constructed as parts of the back plate MNB of the manifold MN. The front plate MNF of the manifold MN also embraces portions of two other similar collars MKH2 and MKC2 of the manifold MN. These collars are also tapered down, as shown, to accommodate the smaller diameters of the adjacent and connecting conduits MH2 and MC2 which supply fluids to the outgoing conduits HC2 and CC2, respectively.

As can be seen from the drawing, the several conduits MH1, MH2, MH3, MC1, MC2 and MNX are longitudinal conduits which are substantially semi-cylindrical. The back plate MNB is pressed or otherwise formed at the factory, so as to produce the bulges or contours required to constitute the longitudinal semi-cylindrical conduits of the manifold MN. Although each of these conduits is substantially semi-cylindrical, as already noted, the corresponding portions of the front plate MNF have no such contours or bulges, but the front plate MNF provides a firm, tight closure for the several conduits. Thus, when the two plates MNF and MNB are joined together by appropriate adhesives or by brazing (or other means) to establish a union or junction between the two plates, each of the several conduits will be completely sealed so that there will be no leakage of fluids when in use. Fluid can only pass longitudinally along the conduits to the various openings already referred to. By having the contours or bulges within only one of the plates, the other plate remaining flat, it becomes unnecessary to maintain alignments to prevent leakage. This is a feature of this invention.

By reference, for example, to FIG. 6 of the drawing, the two plates MNF and MNB are shown from an end view taken along the line R—R of FIG. 5. It will be observed that the two plates MNF and MNB are closely adjacent to each other, and indeed sealed to each other. Segments of each of the collars, such as MKH1, MKC1 and MKC2, are joined to corresponding segments of the front plate MNF to provide a substantially cylindrical collar to which a pipe or conduit of appropriate diameter may be connected and sealed against leakage.

It will be observed from FIG. 5 that the two longitudinal conduits MH1 and MH2 may be substantially perpendicular to each other and interposed in series between the collars MKH1 and MKH2, so that water flowing inwardly through collar MKH1 will travel longitudinally along conduits MH1 and MH2 and out through the collar MKH2. Likewise, the conduits MC1 and MC2 are substantially perpendicular to each other and interposed between the collars MKC1 and MKC2, so that water entering the collar MKC1 may be transmitted through collar MKC2 into the conduit connected thereto. It will be further observed that the conduit MNX has no immediate or direct connection to the conduits previously described with respect to FIG. 5, but conduit MNX interconnects the opening MX with the opening MXO in the front plate MNF. The opening MX provides a path exiting from the valve mechanism VV for water mixed by the valve mechanism VV, the water mixture then traveling over the conduit MNX to be discharged through the opening MNO in the front plate MNF and through the outlet pipe OC to the spout SP for ultimate discharge by the spout end SE.

FIGS. 7 and 8 also show the longitudinal bulges or expansions in the back plate MNB which are previously described and need no repetition. These bulges provide the longitudinal semi-cylindrical conduits of the manifold MN.

FIGS. 9 to 12, inclusive, schematically represent the movable disc MD of the valve mechanism VV in relation to the manifold's conduits, the movable disc MD being shown in its relation to the three ports or openings of the front plate which lead to the valve mechanism VV. In FIG. 9, the disc MD is shown in its position where it will shut off the flow of water into the valve mechanism VV and hence no water will be returned from the valve mechanism VV. When the disc is in this position, therefore, no water will enter the apertures HO or CO and, therefore, no water will leave the valve mechanism VV through the aperture MX. In other words, none of the water entering the collars MKH1 or MKC1 will be transmitted to the valve mechanism VV. But the entering water, however, if it is hot water from conduit HC1, will travel over the conduits MH1 and MH2 and through the collar MKH2 to the outgoing conduit HC2. If the water is cold water from conduit CC1, it will flow through the collar MKC1 over conduit MC2 and out through the collar MKC2 to the exiting conduit CC2.

In FIG. 10, however, the movable disc MD of the valve mechanism VV is shown in its fully open mid-position and therefore arranged so that hot and cold water will be supplied in equal proportions to the common conduit MNX of the manifold MN. FIG. 11 shows the disc MD in a position to transmit only cold water through aperture CO to the common conduit MNX of the manifold MN. The FIG. 12 arrangement shows the disc MD arranged to supply only hot water through aperture CO to the common conduit MNX of the manifold MN.

It is to be especially noted, moreover, that water may be supplied to the outgoing conduits HC2 and CC2 from the corresponding and respective incoming conduits HC1 and CC1, whether or not the valve mechanism VV is open or closed in any of the various positions available to the disc MD of that valve. The amount of water supplied to each particular valve mechanism, such as VV, will depend on the size of the interconnecting conduits of the manifold MN but, more especially, upon the sizes of the openings HO and CO of the manifold MN if the areas of the latter openings are smaller than the cross-sectional areas of the interconnected conduits.

Although the path of water flow has been shown as directed from the conduits HC1 and CC1 to and toward the corresponding conduits HC2 and CC2, respectively, the direction of the flow may be reversed, if desired. That is, the hot water and cold water may enter conduits HC2 and CC2 and travel through the interconnected conduits of the manifold MN to the conduits HC1 and CC1 respectively. Notwithstanding the reversal of the direction of flow of water as just indicated, the disc MD of the valve mechanism VV may be adjusted, as may be desired, either to block all flow of water through the valve mechanism VV or to selectively choose the amount of hot water or cold water, or the mixture of the two, to be transmitted through the various conduits of the manifold MN to the spout SP for discharge by the spout end SE.

If the plates MNF and MNB are to be made of metal, such as stainless steel, for example, of a small gauge, the metallic plate will be sufficient. The front plate MNF may be readily prepared with a single punch press operation which would punch out the holes required for connections to the valve VV and to the output conduit OC, but which would also produce the bulges required in the several collars already described. Likewise, the back plate MNF, and its conduits and collars, if made of stainless steel, could be produced in a single operation. The permanent joinder of the two plates MNF and MNB can be affected by any brazing operation or by any suitable adhesive. If the two plates MNF and MNB are to be made of, for example, a plastic material, these can also be produced by injection molding machines in a single operation.

It has been found that when the two plates MNF and MNB are suitably joined together along their faces, except at the several conduits and the several collars, leakage will be virtually impossible. An appropriate metal, such as stainless steel, or an appropriate plastic, would fully resist leakage through its walls over a very long period of time.

The amount of metal or the amount of plastic required to make the manifolds shown and described herein is relatively small. Metal plates, for example, are readily available. Punch press machines for forming the conduits and the collars according to appropriate dies are also readily available. The time required to make any of these plates in the factory is quite small. Consequently, the costs of manufacturing the manifolds are small indeed. The assembly of the manifolds to incorporate the several externally connected conduits and the valve mechanism VV requires also very little time and the assembly may be performed by unskilled labor on the site where the manifold is to be installed. The reduction in the cost of manufacturing the plumbing fittings, including the manifold, and the cost incurred in the assembly of the necessary parts, make these equipments particularly suitable for meeting the large demand for plumbing materials and services.

As noted, the front plate MNF of manifold MN is generally flat but the back plate MNB is bulged to produce the several conduits of the manifold MN. This renders the manifold MN suitable for incorporation in pre-existing or new wall construction. The flat front plate MNF may constitute part of the flat finished wall construction to which a suitable plumbing fitting may be directly attached and fluidically coupled. The bulging back plate MNB may be, and will be, concealed within the interior of the wall construction. Such a manifold will, therefore, be pleasing in appearance on the finished wall and it will require no significant or important structural wall appurtenances for the installation.

Although the invention has been exemplified in a single lever faucet installation and the manifold MN, it will be readily apparent that other plumbing fittings or fixtures may be used with the manifold MN in the practice of this invention. For example, a simple faucet of any type may be used as part of the structural combination. If the manifold MN were to be coupled to but one fluid path of the faucet, the manifold would embody a single aperture to couple a single conduit of the manifold to the faucet path, so that the faucet will discharge the fluid traveling through the conduit. On the other hand, a valve mechanism of any suitable type may be coupled to but two of the conduits of the manifold by two apertures leading respectively to the two conduits, so that one aperture will allow fluid in one conduit to reach the valve while the other aperture will allow fluid to be returned from the valve through the second aperture to the second conduit. Upon opening the valve, fluid will flow between the two conduits but, upon closure of the valve, the flow of fluid will be interrupted.

Conventional stop valves (not shown) may be used with the manifold MN of this invention. Such stop valves may be coupled through appropriate apertures, incorporated into the front plate MNF, to the longitudinal conduits of manifold MN, or they may be coupled to the exterior conduits such as HC1 and CC1, or HC2 and CC2.

The several conduits of the manifold MN have been shown and described as longitudinal conduits of semi-cylindrical cross-section. Obviously, the conduits may have any other desired shapes, such as rectangular, elliptical or semi-elliptical.

While this invention has been shown and described in certain particular arrangements merely for illustration and explanation, it will be apparent that the many objects and features of this invention may be readily carried out by other and widely varied organizations without departing in any way from the spirit and scope of this invention.

What is claimed is:

1. A manifold for plumbing equipment comprising first and second flat parallel substantially coplanar plates, the first of the coplanar plates containing an elongate semi-cylindrical protrusion therein having its axis substantially coplanar with said first plate, the second coplanar plate being sealed against the first plate so as to provide a barrier wall facing said protrusion, whereby said protrusion and said barrier wall together constitute a main conduit suitable for the flow of fluid therethrough.

2. A manifold for plumbing equipment according to claim 1 in which each of the two plates is formed so as to provide a semicircular collar, said two semicircular collars being adjacent to each other when the plates are sealed to each other so that said semicircular collars may form a passageway which is a continuation of said main conduit and receive a connecting cylindrical conduit.

3. A manifold for plumbing equipment according to claim 1 including four semicircular collars, two of the semicircular collars, one on each of the two plates, being adjacent each other when the two plates are sealed to each other so that said aligned collars will form one end of the main conduit established by the plates, the other two semicircular collars being adjacent each other when the plates are sealed so that said other two aligned collars will form the other end of said main conduit.

4. A manifold for plumbing equipment comprising a plurality of elongated conduits which are substantially semi-cylindrical in shape, said manifold including two substantially flat parallel substantially coplanar plates, one of the plates having a plurality of elongate substantially semi-cylindrical bulges therein, the axes of said bulges being substantially coplanar with the plane of said one plate so that when the two plates are affixed and sealed essentially parallel and contiguous to each other, the bulges will constitute said plurality of conduits for the transmission of fluid.

5. Plumbing equipment comprising a unitary manifold consisting of a plurality of flat parallel plates which face each other and are cohesively joined together, between which plates are formed two substantially semi-cylindrical conduits the axes of which are substantially coplanar with the plane of the plates for receiving hot water and cold water respectively, the material of one of said plates being substantially semi-cylindrically shaped to form a wall portion of said conduits, and a plumbing fixture coupled to said manifold, said manifold having two apertures in one of the plates of said manifold for receiving hot water and cold water from the respective conduits and delivering the water to the plumbing fixture.

6. Plumbing equipment according to claim 5 in which said manifold includes two collars for each of the respective two conduits of the manifold, each half section of each collar being formed by contiguous portions of the flat plates; two pipes coupled to the respective collars for supplying hot water and cold water to the longitudinal conduits of said manifold.

7. Plumbing equipment comprising a manifold having two flat coextensive plates which face each other and are cohesively joined together, between which plates three substantially elongated conduits are formed in one of said plates, said conduits having their axes substantially coplanar with the plane of said flat plates, the other of said plates having three apertures therein, each aperture corresponding to but one of the conduits to permit the flow of fluid therethrough, and a plumbing fixture having three flow paths, two of which receive fluid from two of the conduits of the manifold and the third aperture returning fluid from the third flow path of said fixture to the third conduit of the manifold, said plumbing fixture including valve mechanism for controlling the fluid flow into the two receiving flow paths of the fixture.

8. Plumbing equipment according to claim 7 in which said plumbing fixture is a single lever faucet having a valve mechanism and a mixing chamber, the fluid returned by the plumbing fixtures to the third conduit of the manifold being discharged through the spout of the faucet.

9. A manifold for a flat wall comprising two substantially flat parallel coextensive plates which face each other, one of said plates having an elongate substantially semi-cylindrical bulge therein providing a conduit between said plates having its axis substantially coplanar with the plane of said one plate when said plates are sealed to each other, and means for sealing the two plates coextensively to each other, the other of said plates having an aperture therein opening into said bulge so that fluid may be transmitted through said conduit and through said aperture.

10. A manifold according to claim 9, including also a plumbing fitting having an aperture therein to receive fluid which is to flow through the plumbing fitting, the aperture of said plumbing fitting being communicative with said aperture in the plate of said manifold so that fluid may flow through the interior of said conduit provided between both plates of the manifold and through the two apertures.

11. A manifold for a flat wall comprising first and second substantially flat parallel plates which face each other, said first plate having two non-contiguous elongate substantially semi-cylindrical bulges providing two separate conduits having their axes substantially coplanar with the plane of said first plate when said plates are sealed to each other, two apertures being provided in said second plate, one of the apertures in the second plate opening into one of the conduits and the other aperture in said second plate opening into the other of the conduits, means for sealing said first and second plates to each other, and means providing a fluid path between said two apertures so that fluid may be transmitted between one conduit and the other.

12. A manifold according to claim 11 in which the means providing a fluid path comprises a plumbing fitting having two apertures which are respectively aligned with the apertures in said second plate so that fluid may be transmitted in a continuous path between said conduits and through the apertures of said fitting.

13. A manifold according to claim 12, in which first and second cylindrical collars are formed in said manifold each about one of the conduits of the manifold, so that pipes may be connected to the respective conduits of said manifold.

* * * * *